US010838630B2

(12) United States Patent
Sterns et al.

(10) Patent No.: US 10,838,630 B2
(45) Date of Patent: Nov. 17, 2020

(54) WRITE-AHEAD LOG MAINTENANCE AND RECOVERY

(71) Applicant: NetApp, Inc., Sunnyvale, CA (US)

(72) Inventors: Randolph Sterns, Boulder, CO (US); Charles Binford, Wichita, KS (US); William Delaney, Wichita, KS (US); Joseph Blount, Wichita, KS (US); Keith Moyer, Wichita, KS (US); Joseph Moore, Wichita, KS (US)

(73) Assignee: NETAPP, INC., Sunnyvale, CA (US)

(*) Notice: Subject to any disclaimer, the term of this patent is extended or adjusted under 35 U.S.C. 154(b) by 127 days.

(21) Appl. No.: 15/131,658

(22) Filed: Apr. 18, 2016

(65) Prior Publication Data
US 2017/0300250 A1 Oct. 19, 2017

(51) Int. Cl.
G06F 11/00 (2006.01)
G06F 3/06 (2006.01)
G06F 11/14 (2006.01)

(52) U.S. Cl.
CPC ............ G06F 3/0619 (2013.01); G06F 3/065 (2013.01); G06F 3/0605 (2013.01); G06F 3/0617 (2013.01); G06F 3/0683 (2013.01); G06F 11/1471 (2013.01); G06F 2201/805 (2013.01); G06F 2201/82 (2013.01); G06F 2201/84 (2013.01)

(58) Field of Classification Search
CPC ............ G06F 11/1402; G06F 11/1407; G06F 11/1438; G06F 11/1441; G06F 11/1446; G06F 11/1471; G06F 2201/805; G06F 2201/82; G06F 2201/84
See application file for complete search history.

(56) References Cited

U.S. PATENT DOCUMENTS 6,185,663 B1 * 2/2001 Burke ................ G06F 11/1471
707/999.202
6,678,809 B1 * 1/2004 Delaney ............... G06F 3/0617
707/999.202

(Continued)

OTHER PUBLICATIONS

International Preliminary Report on Patentability for Application No. PCT/US2017/014111 dated Aug. 2, 2018, 7 pages.

(Continued)

Primary Examiner — Elmira Mehrmanesh
(74) Attorney, Agent, or Firm — Haynes and Boone, LLP

(57) ABSTRACT

A system for tracking metadata changes and recovering from system interruptions. With host I/O, corresponding metadata incremental changes are aggregated and stored in a write-ahead log before being performed to their in-memory buffers. As those buffers are flushed, checkpoints are created and stored in the log. As the log wraps to the start, older entries are overwritten after they are freed from any remaining dependencies by newer checkpoints. If metadata entities have not created new checkpoints, they are instructed to in order to free up space for new aggregated batches and checkpoints. After an interruption, the wrap point is located in the log. From the wrap point, the log is scanned backwards to provide checkpoints to metadata entities. The log is then scanned forwards to perform changes specified by aggregated batches. The metadata entities' volatile memory states are recovered to what they were before the interruption.

17 Claims, 8 Drawing Sheets

(56) References Cited

U.S. PATENT DOCUMENTS

| | | | |
|---|---|---|---|
| 7,363,457 B1* | 4/2008 | Dekoning | G06F 3/0607 |
| | | | 711/112 |
| 7,792,802 B1* | 9/2010 | Rao | G06F 11/1461 |
| | | | 707/657 |
| 7,860,836 B1* | 12/2010 | Natanzon | G06F 11/1471 |
| | | | 707/648 |
| 8,250,324 B2* | 8/2012 | Haas | G06F 11/1446 |
| | | | 711/156 |
| 8,806,115 B1* | 8/2014 | Patel | G06F 11/1471 |
| | | | 711/103 |
| 8,826,273 B1* | 9/2014 | Chen | G06F 9/45558 |
| | | | 718/1 |
| 9,128,820 B1 | 9/2015 | Malina | |
| 9,372,743 B1* | 6/2016 | Sethi | G06F 11/0751 |
| 2007/0100917 A1* | 5/2007 | Amano | G06F 11/1435 |
| 2009/0300086 A1 | 12/2009 | Bacon et al. | |
| 2011/0126045 A1 | 5/2011 | Bennett et al. | |
| 2012/0066439 A1 | 3/2012 | Fillingim | |
| 2013/0024641 A1 | 1/2013 | Talagala et al. | |
| 2013/0332688 A1* | 12/2013 | Corbett | G06F 17/30088 |
| | | | 711/162 |
| 2014/0068219 A1 | 3/2014 | McNutt | |
| 2014/0115233 A1 | 4/2014 | Goss et al. | |
| 2014/0237173 A1* | 8/2014 | Cong | G06F 11/1435 |
| | | | 711/104 |
| 2014/0279900 A1* | 9/2014 | Gupta | G06F 17/30309 |
| | | | 707/634 |
| 2014/0310483 A1* | 10/2014 | Bennett | G06F 12/00 |
| | | | 711/154 |
| 2015/0039577 A1* | 2/2015 | Talagala | G06F 9/467 |
| | | | 707/703 |
| 2015/0212897 A1* | 7/2015 | Kottomtharayil | G06F 11/1448 |
| | | | 714/20 |
| 2016/0110105 A1 | 4/2016 | Karamcheti et al. | |

OTHER PUBLICATIONS

International Preliminary Report on Patentability for Application No. PCT/US2017/014251 dated Aug. 9, 2018, 11 pages.
International Search Report and Written Opinion for Application No. PCT/US2017/014111 dated Apr. 7, 2017, 15 pages.
International Search Report and Written Opinion for Application No. PCT/US2017/014251 dated Mar. 30, 2017, 18 pages.

* cited by examiner

WRITE-AHEAD LOG MAINTENANCE AND RECOVERY

TECHNICAL FIELD

The present description relates to data storage systems, and more specifically, to write ahead logs with expanded capabilities and techniques for their maintenance and application in data storage systems.

BACKGROUND

In some storage systems, such as high-availability storage systems, data that is input from one or more hosts may be persisted to one or more storage devices logically grouped as one or more volumes before metadata regarding the input is updated. For example, in some storage systems indirection may be used to map (e.g., the metadata regarding the input) between the addresses provided by one or more hosts to identify volumes and the logical and physical locations of the storage devices maintained by the storage system. This enables the hosts to generically interface with the storage system without having to know the particular configuration of the specific storage system.

When indirection is used, metadata in the system is generally maintained and updated by the storage system to track important properties of the user data, such as the physical location where that data is stored within the storage system. When modifying metadata associated with a large amount of user data, direct updates of the metadata structures can consume large amounts of system resources, since that metadata may be scattered across the storage system's internal storage resources. Instead of performing expensive direct updates of scattered metadata structures, at least a portion of the metadata may be maintained in volatile system memory and periodically persisted to nonvolatile storage. Write-ahead logging may be used to track these in-memory changes to preserve consistency in the event of a system interruption.

Current approaches to write-ahead logging are limited in how many clients (e.g., in-memory structures such as buffers and/or devices that may be tracked) may share the same write-ahead log, imposing a greater burden on the storage system to maintain potentially multiple write-ahead logs. Further, as the write-ahead logs may be limited in size, reuse of portions of the write-ahead log that contain old and/or invalid data typically relies upon garbage collection, which can be an additional burden on processing resources for the storage system.

BRIEF DESCRIPTION OF THE DRAWINGS

The present disclosure is best understood from the following detailed description when read with the accompanying figures.

DETAILED DESCRIPTION

Figure 1:
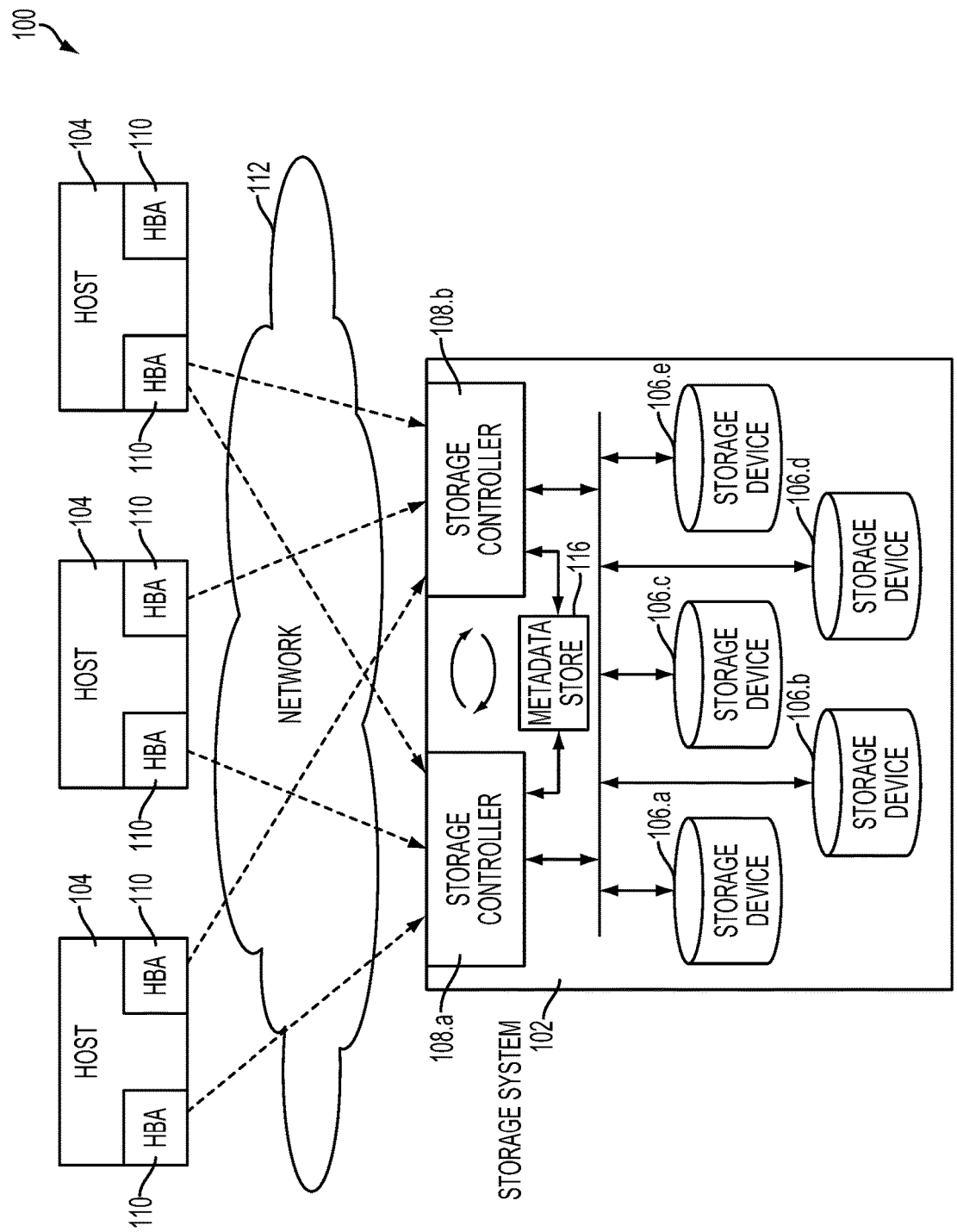
FIG. 1 is an organizational diagram of an exemplary data storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for maintaining and using write-ahead logs with expanded capabilities in a storage system. As write I/Os are written to storage devices in a storage system, corresponding metadata (e.g., identifying how to translate addresses specified in the host I/O to physical locations in the storage devices) also changes. The storage system tracks the changes to the metadata and bundles them into aggregated batches (also referred to as incremental change sets herein). These aggregated batches are persisted to a write-ahead log before the incremental changes are made to the metadata entities affected, for example to buffers in volatile memory. These metadata entities (e.g., buffers) may also be referred to as clients, metadata clients, or metadata structures.

When the metadata entities' volatile memory buffers (e.g., accumulation buffers for change descriptors) fill to their allocated capacity, the contents of the volatile buffers may be persisted to non-volatile storage. When that occurs, a checkpoint may be made of the flushed buffer for the metadata client (e.g., an image of the buffer) and stored in the write-ahead log. Afterward, any incremental changes made to that metadata entity's data may be recorded in additional aggregated batches based off of that new checkpoint. Alternatively, more or all of the data may be maintained in volatile memory without flushing and, in that situation, checkpoints may occur based upon how close the oldest dependency aggregated batch is to a wrap point in the write-ahead log. Since the checkpoint incorporates any of the incremental changes identified in previous aggregated batches, older aggregated batches stored in the write-ahead log may eventually cease being depended upon. The write-ahead log may reclaim this space by overwriting it with new aggregated batches and/or checkpoints as the storage system wraps through the write-ahead log.

Sometimes, some metadata entities may not flush their volatile memory buffers as frequently as other metadata entities, resulting in older checkpoints with older aggregated batch dependencies. As the wrap point in the write-ahead log progresses, the amount of "free" space in the log (e.g., space with old checkpoints and aggregated batches that are no longer relied upon) may fall below a threshold. At that time, the metadata entities with older checkpoints with older aggregated batch dependencies may be instructed to move along with a new checkpoint with newer dependencies. As a result, those instructed to move along make new checkpoints in the write-ahead log (images of the in-buffer contents that are then flushed to persistent storage), removing any remaining dependencies on the older aggregated batches. Thus free space is periodically created to allow the write-ahead log to progress the wrap point as new information is to be stored in it.

At times, the storage system may become interrupted such that a restart/reboot occurs. When that happens, the contents of the metadata entities' buffers in volatile memory are lost and the storage system seeks to recover it so that a consistent state may be maintained. The storage system instantiates the write-ahead log and then the metadata entities. The metadata entities register what checkpoints they are interested in. The storage system locates the wrap point in the write-ahead log, for example by identifying where a write sequence number changes (corresponding to how many times the write-ahead log has wrapped, for example). The write sequence number may also be referred to herein as a wrap sequence number. From there, the storage system performs a backward scan from the wrap point, focusing on identifying checkpoints during this scan (e.g., to the exclusion of aggregated batches). As checkpoints are identified, they are provided to the metadata entities that registered an interest in them. The entities are able to recover, from the checkpoints, a condition of their pre-interruption state in volatile memory (e.g., whether current or with some stale components that are updated by aggregated batch(es)).

Once the last checkpoint has been identified and provided to the corresponding metadata entity, the storage system then locates the oldest aggregated batch identified in a checkpoint (e.g., whether that is the last checkpoint identified from the backward scan or some "newer" checkpoint that lists the oldest aggregated batch dependency as tracked during the backward scan) and begins forward scanning from there. In this forward scan, the storage system focuses on identifying aggregated batches (e.g., to the exclusion of checkpoints). As the aggregated batches are identified, they are replayed by the storage system, so that the incremental changes recorded therein are performed to the impacted metadata entities' volatile memory states (to the information recovered from the checkpoints). The forward scanning stops once the storage system reaches the wrap point again, resulting in the metadata entities' volatile memory states being restored to their states that existing prior to the interruption.

As a result, a storage system is able to more efficiently process metadata changes during system I/O, including fewer writes to persistent metadata storage (e.g., avoiding write amplification with host I/O writes). Further, a storage system may more efficiently recover from system interruption events by focusing recovery efforts on only that data that is relevant to a given metadata entity.

FIG. 1 illustrates a data storage architecture 100 in which various embodiments may be implemented. Specifically, and as explained in more detail below, one or both of the storage controllers 108.a and 108.b read and execute computer readable code to perform the methods described further herein to maintain a write-ahead log during system operation and use the write-ahead log to replay changes to metadata clients in volatile memory after an interruption.

The storage architecture 100 includes a storage system 102 in communication with a number of hosts 104. The storage system 102 is a system that processes data transactions on behalf of other computing systems including one or more hosts, exemplified by the hosts 104. The storage system 102 may receive data transactions (e.g., requests to write and/or read data) from one or more of the hosts 104, and take an action such as reading, writing, or otherwise accessing the requested data. For many exemplary transactions, the storage system 102 returns a response such as requested data and/or a status indictor to the requesting host 104. It is understood that for clarity and ease of explanation, only a single storage system 102 is illustrated, although any number of hosts 104 may be in communication with any number of storage systems 102.

While the storage system 102 and each of the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes a processor such as a microcontroller or a central processing unit (CPU) operable to perform various computing instructions. The instructions may, when executed by the processor, cause the processor to perform various operations described herein with the storage controllers 108.a, 108.b in the storage system 102 in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106 and responds to one or more hosts 104's data transactions so that the storage devices 106 may appear to be directly connected (local) to the hosts 104. In various examples, the storage devices 106 include hard disk drives (HDDs), solid state drives (SSDs), optical drives, and/or any other suitable volatile or non-volatile data storage medium. In some embodiments, the storage devices 106 are relatively homogeneous (e.g., having the same manufacturer, model, and/or configuration). However, the storage system 102 may alternatively include a heterogeneous set of storage devices 106 that includes storage devices of different media types from different manufacturers with notably different performance.

The storage system 102 may group the storage devices 106 for speed and/or redundancy using a virtualization technique such as RAID or disk pooling (that may utilize a RAID level). The storage system 102 also includes one or more storage controllers 108.a, 108.b in communication with the storage devices 106 and any respective caches. The storage controllers 108.a, 108.b exercise low-level control over the storage devices 106 in order to execute (perform) data transactions on behalf of one or more of the hosts 104. The storage controllers 108.a, 108.b are illustrative only; more or fewer may be used in various embodiments. Having at least two storage controllers 108.a, 108.b may be useful, for example, for failover purposes in the event of equipment failure of either one. The storage system 102 may also be communicatively coupled to a user display for displaying diagnostic information, application output, and/or other suitable data.

In an embodiment, the storage system 102 may group the storage devices 106 using a dynamic disk pool (DDP) (or other declustered parity) virtualization technique. In a DDP, volume data, protection information, and spare capacity are distributed across all of the storage devices included in the pool. As a result, all of the storage devices in the DDP remain active, and spare capacity on any given storage device is available to all volumes existing in the DDP. Each storage device in the DDP is logically divided up into one or more data extents (which may also be referred to as data blocks herein) at various block addresses of the storage device. A data extent (or block) is assigned to a particular data stripe of a volume.

An assigned data extent becomes a "data piece," and each data stripe has a plurality of data pieces, for example sufficient for a desired amount of storage capacity for the volume and a desired amount of redundancy, e.g. RAID 0, RAID 1, RAID 10, RAID 5 or RAID 6 (to name some examples). As a result, each data stripe appears as a mini RAID volume, and each logical volume in the disk pool is typically composed of multiple data stripes. Further, according to embodiments of the present disclosure, one or more data stripes may compose a given segment as used herein (i.e., a segment may include some integer number of data stripes).

In addition, the storage system 102 may also include a metadata store 116. The metadata store 116 may be composed of one or more storage devices, such as one or more solid-state devices. In an embodiment, the metadata store 116 may also be grouped using DDP as a virtualization technique. The metadata store 116 may serve to store metadata regarding data (e.g., written from one or more hosts 104) in the storage devices 106. The metadata store 116 may also serve to store the write-ahead log according to embodiments of the present disclosure. In an embodiment, write data may be received from one or more hosts 104 and momentarily stored in a write-back cache of the storage system 102, e.g. using logical block addresses (LBAs). The metadata store 116 may house one or more types of metadata to facilitate translating the specified LBAs of the data in the write-back cache to block addresses used by the storage devices 106.

For example, the metadata store 116 may house a tree data structure (referred to more generally as a mapping table) that facilitates translation of a specified volume/LBA to a back-end repository address. The metadata store 116 may also include mapping tables (e.g., a global index that maps between identifiers used in the mapping tables such as tree data structure and block addresses (the physical locations) used for the storage devices 106). One or more of the mapping tables may include one or more partitions to allow for updates at a desired granularity that may be smaller than the host I/O is at. There may be multiple types of tables, trees, and/or logs according to embodiments of the present disclosure that are to be kept self-consistent regardless of interruption points.

Different portions of the metadata store 116 may be used for the different entities mentioned above, such that a first portion may be a repository for structure first mapping table (e.g., a tree) and have its own DDP structure (as a single example—there may be any number of these in a system at a given point in time). A second portion may be a separate repository for a second mapping table (e.g., an index) and also have its own DDP structure (as a single example—there may be any number of these in a system at a given point in time). A third portion may be a separate repository for the write-ahead log and have its own DDP structure. In an embodiment, each of the storage controllers 108.a, 108.b may maintain a separate write-ahead log for their respective operations. The different information destined for the metadata store 116 (e.g., mapping tables and/or write-ahead log entries) may be addressed into the metadata store 116 with metadata block addresses associated with metadata objects.

According to embodiments of the present disclosure, the write-ahead log stored in the metadata store 116 may include two different types of data structures (and data): aggregated batch control (ABC) objects (also referred to herein as incremental change sets) and checkpoints. As used herein, an ABC object (also referred to simply as an ABC) refers to a structure that is used to track related activities that are to be completed in order to move metadata and data storage states of the storage system 102 from one consistent point to another. Specifically, the ABC object describes what incremental changes should be performed to one or more metadata structures within volatile memory of the storage system 102 (e.g., DRAM) to ensure that the relevant mapping table(s) information is updated (and the related information is protected from being lost in the event of a reboot, power failure, etc.).

Further, the write-ahead log may include checkpoints. As used herein, a checkpoint refers to a structure that is used to summarize the state of a metadata object in volatile memory at a given point in time. In other words, a checkpoint may be a full backup copy (e.g., an image) of the contents of a volatile memory for a given metadata client at a point in time. As further used herein, a metadata client may be any type of metadata structure tracked/maintained by the storage system 102, such as mapping tables and their partitions (to name just a few examples). Particular metadata structures may keep track of different types of data, and therefore for a given metadata structure (e.g., a mapping table, index, or tree that may be in the form of an accumulation buffer or segment data) there may be several components that have their own checkpoints for corresponding metadata clients. A checkpoint may be used to reduce the reliance on a long chain of ABCs by performing a full image of the data for a given metadata client, which captures the state that is maintained for that metadata client in volatile memory.

For example, a checkpoint of a particular mapping table may provide a complete view of the mapping table at the point in time when the checkpoint was taken. A checkpoint may record a dependency that its corresponding metadata structure has on one or more ABC objects that concern data of interest to the checkpoint. For example, the storage controller 108 may not have completed incremental updates to relevant metadata structures specified in a given ABC object before the checkpoint has is done being created. Therefore, the storage controller 108 may include a dependency in the checkpoint on that not-yet-completed ABC object. Generally, the dependency may reference a number identifying the ABC following the most recent ABC to have been applied to the corresponding metadata structure before the checkpoint was taken (e.g., one plus the most recent completed ABC). Further, the checkpoint will record dependencies on ABCs that will be created in the future (but those that do not impact the metadata structure that this checkpoint corresponds to may be ignored).

In the present example, storage controllers 108.a and 108.b are arranged as an HA pair. Thus, when storage controller 108.a performs a write operation for a host 104, storage controller 108.a may also sends a mirroring I/O operation to storage controller 108.b. Similarly, when storage controller 108.b performs a write operation, it may also send a mirroring I/O request to storage controller 108.a. Each of the storage controllers 108.a and 108.b has at least one processor executing logic to maintain a write-ahead log and use it for recovery from an interruption according to embodiments of the present disclosure.

With respect to the hosts 104, a host 104 includes any computing resource that is operable to exchange data with storage system 102 by providing (initiating) data transactions to the storage system 102. In an exemplary embodiment, a host 104 includes a host bus adapter (HBA) 110 in communication with a storage controller 108.a, 108.b of the storage system 102. The HBA 110 provides an interface for communicating with the storage controller 108.a, 108.b, and in that regard, may conform to any suitable hardware and/or software protocol. In various embodiments, the HBAs 110 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire.

The HBAs 110 of the hosts 104 may be coupled to the storage system 102 by a network 112, for example a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), the Internet, Fibre Channel, or the like. In many embodiments, a host 104 may have multiple communicative links with a single storage system 102 for redundancy. The multiple links may be provided by a single HBA 110 or multiple HBAs 110 within the hosts 104. In some embodiments, the multiple links operate in parallel to increase bandwidth.

To interact with (e.g., write, read, modify, etc.) remote data, a host HBA 110 sends one or more data transactions to the storage system 102. Data transactions are requests to write, read, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by writing, reading, or otherwise accessing data on the relevant storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

According to embodiments of the present disclosure, when a write I/O is sent from a host 104 to the storage system 102, a storage controller 108 (either 108.a or 108.b) may write the data to the destination on one or more storage devices 106. The storage controller 108 may then create an ABC object that defines what metadata should change to reflect the write (e.g., an update to one or more mapping tables associated with different metadata entities). The storage controller 108 may aggregate multiple of these types of metadata changes for multiple host actions (e.g., to different or same volumes/data) into a given ABC object. The storage controller 108 may persist the ABC object to its write-ahead log in the metadata store 116. After persisting the ABC object, the storage controller 108 may then proceed to update the metadata structures in volatile memory that were impacted by the host I/O.

As the portions of the volatile memory that are allocated to the different metadata structures reach their allocated capacity, the storage controller 108 may "flush" the contents of those portions to an appropriate portion of the metadata store 116. After this flush, the storage controller 108 may take a checkpoint of that portion for that metadata client and store it in the write-ahead log. This provides a mechanism to proactively decrease the size and processing burden of checkpoints according to embodiments of the present disclosure. In particular, as the contents of the volatile memory (e.g., an accumulation buffer) fills up to some specified threshold and/or maximum, the metadata is persisted to the metadata store 116. At that time, the particular accumulation buffers have a smaller size (e.g., empty or a minimum size specified for the buffer) than prior to the persist action. As a result, taking the checkpoint at this time results in a smaller checkpoint than were the checkpoint taken before the persist action, because the quantity of data in the portions of the volatile memory is at a smaller, or minimum, amount.

Data transactions are often categorized as either block-level or file-level. Block-level protocols designate data locations using an address within the aggregate of storage devices 106. Suitable addresses include physical addresses, which specify an exact location on a storage device, and virtual addresses, which remap the physical addresses so that a program can access an address space without concern for how it is distributed among underlying storage devices 106 of the aggregate. Exemplary block-level protocols include iSCSI, Fibre Channel, and Fibre Channel over Ethernet (FCoE). iSCSI is particularly well suited for embodiments where data transactions are received over a network that includes the Internet, a WAN, and/or a LAN. Fibre Channel and FCoE are well suited for embodiments where hosts 104 are coupled to the storage system 102 via a direct connection or via Fibre Channel switches. A Storage Attached Network (SAN) device is a type of storage system 102 that responds to block-level transactions.

In contrast to block-level protocols, file-level protocols specify data locations by a file name. A file name is an identifier within a file system that can be used to uniquely identify corresponding memory addresses. File-level protocols rely on the storage system 102 to translate the file name into respective memory addresses. Exemplary file-level protocols include SMB/CIFS, SAMBA, and NFS. A Network Attached Storage (NAS) device is a type of storage system that responds to file-level transactions. As another example, embodiments of the present disclosure may utilize object-based storage, where objects are instantiated that are used to manage data instead of as blocks or in file hierarchies. In such systems, objects are written to the storage system similar to a file system in that when an object is written, the object is an accessible entity. Such systems expose an interface that enables other systems to read and write named objects, that may vary in size, and handle low-level block allocation internally (e.g., by the storage controllers 108.a, 108.b). It is understood that the scope of present disclosure is not limited to either block-level or file-level protocols or object-based protocols, and in many embodiments, the storage system 102 is responsive to a number of different data transaction protocols.

Figure 2:
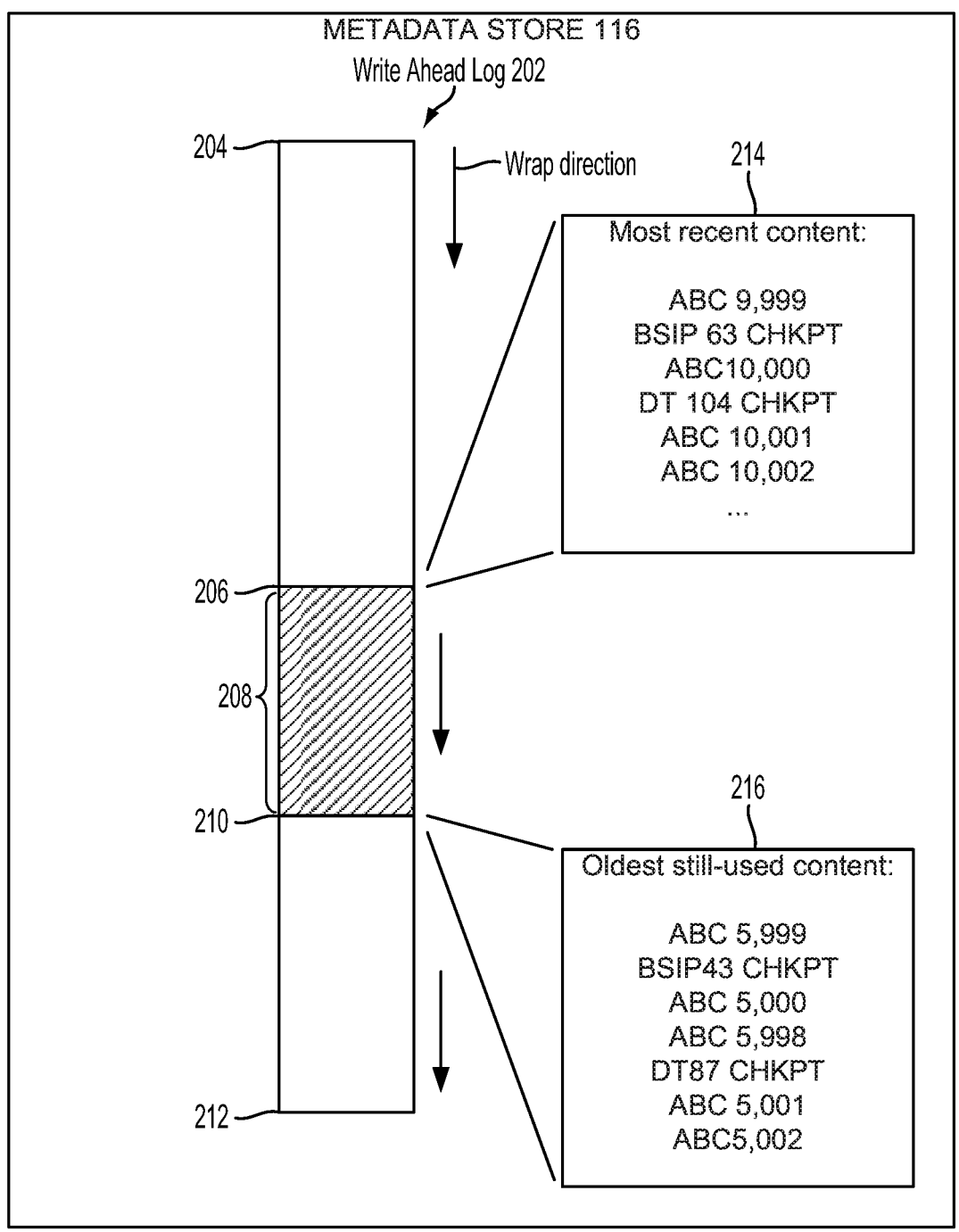
FIG. 2 is an organizational diagram of an exemplary write-ahead log architecture according to aspects of the present disclosure.

FIG. 2 is an organizational diagram of an exemplary write-ahead log 202 architecture in the metadata store 116 of storage system 102 according to aspects of the present disclosure. For example, the write-ahead log 202 may be stored in a separate repository (or set aside extents within a repository) of the metadata store 116 to temporarily persist metadata corresponding to changes to user data. As illustrated, the write-ahead log 202 comprises a small volume in a DDP on the metadata store 116 that has a starting LBA 204 (e.g., 0 or some other value) and an ending (maximum) LBA 212. Thus, the write-ahead log 202 may be a circular buffer that wraps from the ending LBA 212 to the starting LBA 204 while in use.

The write-ahead log 202 further includes a wrap point 206 which corresponds to the current location within the write-ahead log 202 to which a storage controller 108 may write. Section 208 of the write-ahead log 202 corresponds to a portion of the write-ahead log 202 where it is currently safe for the storage controller 108 to write. This may correspond to as-yet unused space in the write-ahead log 202 or, more often, to portions of the write-ahead log 202 that has content on which other content (e.g., checkpoints or ABCs) no longer depends. This content in section 208 is therefore safe to overwrite. In an embodiment, the storage controller 108 may track the size of the section 208 and seek to maintain its size as a percentage of the overall size of the write-ahead log 202.

At the wrap point 206, the most recent content 214 is illustrated as a series of ABCs and checkpoints—specifically, the most recent content 214 is the ABC 10,002, preceded by older ABCs 10,001, 10,000, and 9,999 as well as a tree data structure checkpoint 104 and an index partition checkpoint 63 (as two examples of mapping table types). The next metadata to come in, whether it is a checkpoint or an ABC, will be written at the wrap point 206 at the next available location in the section 208. Dependency point 210 corresponds to the oldest remaining dependency in the write-ahead log 202. This refers to the oldest checkpoints still in use (e.g., new checkpoints for the corresponding metadata structure have not been created/stored yet) and the oldest ABCs that they (or any other checkpoints in the write-ahead log 202) depend on in the write-ahead log 202. In the illustrated example, the oldest ABC on which one or more other checkpoints still depend is ABC 5,999, and the oldest checkpoint that is still in use is global index partition checkpoint 43.

If, while ABC and/or checkpoint data is being written to the write-ahead log 202, the ending LBA 212 of the log is reached, the rest of the data for that metadata structure may be wrapped and written at the starting LBA 204 (e.g., where the section 208 at that time is located at the starting LBA 204). The storage controller 108 is able to determine whether data in the write-ahead log 202 may be overwritten by checking the dependencies identified in the log.

Figure 3:
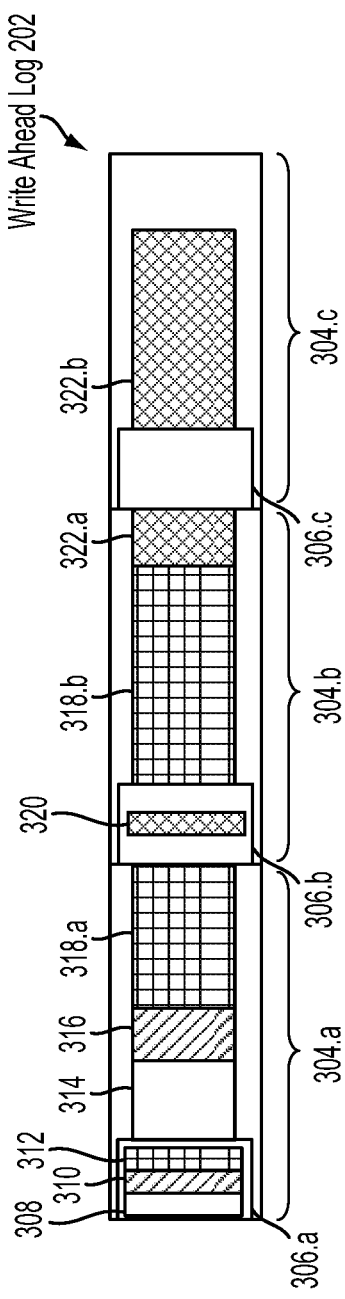
FIG. 3 is an organizational diagram of an exemplary relationship between data structures in a write-ahead log according to aspects of the present disclosure.

FIG. 3 illustrates an organizational diagram 300 of an exemplary portion of a write-ahead log architecture according to aspects of the present disclosure. In particular, the write-ahead log architecture illustrated in FIG. 3 provides an example of how values may be included in per-extent (also referred to as per-block) headers (and/or, in some embodiments, footers) that include values useful in locating the wrap point 206 of FIG. 2.

As illustrated in FIG. 3, the write-ahead log 202 may be divided into a plurality of data extents 304, specifically 304.a, 304.b, and 304.c. This is for illustration only, as there may be any number of data extents for a given write log 202. Each data extent 304 may be the same size, for example 4 Kilobytes as just one example. Each data extent 304 may include a header 306, e.g. 306.a, 306.b, and 306.c corresponding to their respective extents 304. The information included in these headers 306 (and/or footers in some embodiments) may also be referred to as in-line descriptors that allow the storage controller 108 to dynamically locate the wrap point 206 without reference to a superblock to keep track of the information.

Within header 306.a are the in-line descriptors 308, 310, and 312. Each in-line descriptor corresponds to a different metadata tracking structure that has been at least partially stored within the data extent 304.a. Further, each in-line descriptor may include different elements of data, including for example a per-physical-block cyclic redundancy check (CRC) and a write sequence number. Exemplary embodiments and aspects of such descriptors are discussed in more detail in the patent application Ser. No. 15/135,161, filed Apr. 21, 2016, which is incorporated by reference herein in its entirety as though fully set forth herein. According to embodiments of the present disclosure, the write sequence number may correspond to the number of times that the storage controller 108 has wrapped through the write-ahead log 202. For example, the first time through the storage controller 108 includes a write sequence number of 1 in the headers (e.g., in this illustrated example headers 306.a, 306.b, and 306.c). When the first wrap occurs, the storage controller 108 increments the write sequence number (either as its own value that is then placed in headers, or by incrementing the value already in the headers, for example) so that as new metadata tracking structures are stored in the body of the given data extent, a write sequence number of 2 is stored in the in-line descriptors. This incrementing may continue through each wrap through the write-ahead log 202.

As can be seen, the different metadata tracking structures may have variable lengths of data. For example, in-line descriptor 308 corresponds to a first variable-length metadata tracking structure 314. In-line descriptor 310 corresponds to a second variable-length metadata tracking structure 316. Further, in-line descriptor 312 corresponds to a third variable-length metadata tracking structure 318.

For example, the metadata tracking structure 314 may represent a checkpoint that was taken shortly after the corresponding metadata client (e.g., a mapping table) flushed a full buffer in volatile memory to persistent storage, and thus the cost to storing the checkpoint was noticeably reduced (e.g., in the size used to store the checkpoint). As illustrated, the metadata tracking structure 318 is large enough that it does not fully fit within the data extent 304.a. It therefore extends into the data extent 304.b. However, since it had an in-line descriptor 312 in the header 306.a, it is not included again in the header 306.b. Instead, the header 306.b includes an in-line descriptor 320 for the variable-length metadata tracking structure 322 that begins in the data extent 304.b.

Since the metadata tracking structure 318 occupied a noticeable amount of space in the data extent 304.b, the metadata tracking structure 322 does not fully fit within the space of data extent 304.*b* and extends into data extent 304.*c*. As there is not, in this illustration, yet additional metadata tracking structures stored after the end of the metadata tracking structure portion 322.*b*, an in-line descriptor is not yet present in the header 306.*c*.

Figure 4:
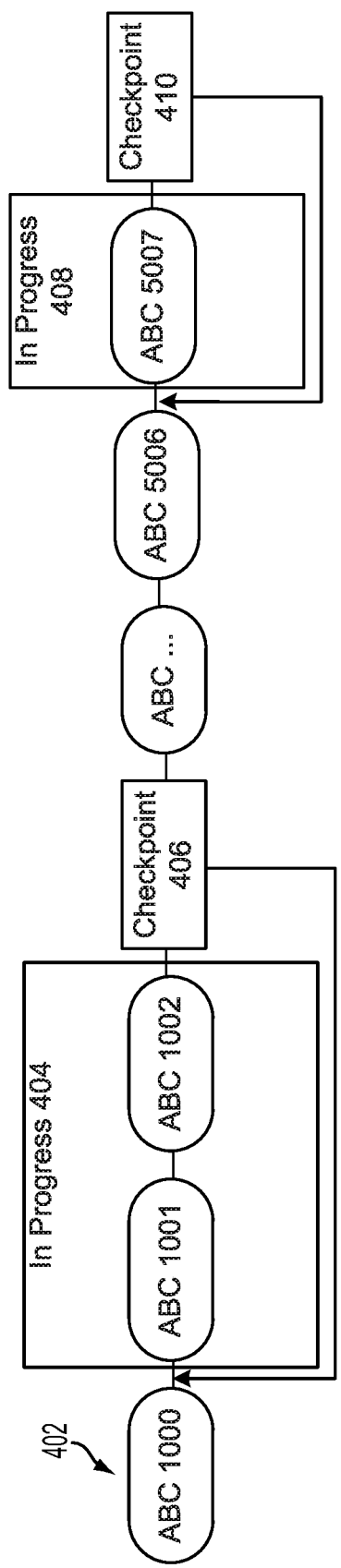
FIG. 4 is an organizational diagram of exemplary relationship dependencies between data structures in a write-ahead log according to aspects of the present disclosure.

Turning now to FIG. 4, an organizational diagram of an exemplary relationship between data structures in a write-ahead log 202 is illustrated according to aspects of the present disclosure. A portion of the write-ahead log 202 is illustrated in logical form for ease of illustration and discussion. In particular, FIG. 4 illustrates a stream of ABCs (referred to collectively as ABCs 402 for FIG. 4) and checkpoints (here, just checkpoints 406 and 410 are illustrated) and their relationship with respect to a single data structure for a given metadata client, though the write-ahead log 202 would generally support a large number of metadata clients and not illustrated here for simplicity of discussion.

In the write-ahead log 202, a first ABC 1000 may be written at a first location. ABCs 1001 and 1002 follow ABC 1000. As illustrated, these are ABCs that are still in progress 404, meaning, that they have been created and have incremental changes that have not been made to the metadata structures identified in them (e.g., mapping tables) at the time that checkpoint 406 is created. Thus, these ABCs have been persisted to non-volatile memory already but still are in the process of completion. For example, ABC 1001 may be written to the next available area of the write-ahead log 202, such as the first space available in the section 208 of FIG. 2, followed by ABC 1002, and remain there as the incremental changes specified therein are completed.

While ABCs are in progress 404, the storage controller 108 may create a checkpoint 406 for a metadata client that has a dependency on one or more of the ABCs 1001 or 1002. For example, if the checkpoint 406 records a dependency of its metadata client starting at 1001, this indicates that the incremental change identified by ABC 1000 has already been made to the metadata in the volatile memory, which is captured by the checkpoint 406. Any incremental changes identified by the ABCs 1001 and 1002 would not be captured yet by the checkpoint 406. As the checkpoint 406 is being generated/persisted, the storage system 102 may not be locked down but instead continue operation. Once the checkpoint 406 is persisted to the write-ahead log 202 in the metadata store 116, the metadata client that created checkpoint 406 may ignore the ABC 1000 (and, e.g., any older ABCs with lower numbers where applicable). An ABC may have changes for multiple metadata clients and, as such, there may be checkpoints for other metadata clients that record a smaller ABC number than 1000, meaning they depend on ABC 1000 still. So until any other remaining dependencies are removed, ABC 1000 remains relevant and should not be overwritten.

In an alternative embodiment, the ABCs 1001 and 1002 may not be in progress (also referred to as "in flight") at the time that the checkpoint 406 is created and persisted. In that case, the checkpoint 406 would incorporate the incremental changes for the represented metadata client specified by one or more of the ABCs 1000, 1001, and 1002 so that checkpoint 406 does not have to rely on those ABCs anymore. Under either approach (whether certain ABCs are in flight or not), once the storage controller 108 has persisted the checkpoint 406 to the metadata store 116, the metadata client for which the checkpoint 406 was created may update its advertised dependency to the most recent ABC (if any) which includes incremental change(s) not captured by the checkpoint 406. If no ABCs were in flight when the checkpoint 406 was generated, the new advertised dependency number may be for an ABC which has not yet been created (e.g., the value of the ABC that has most recently completed processing plus one, so as to remain safe).

In similar fashion as described above with respect to checkpoint 406, the checkpoint 410 may be created some time later that incorporates the incremental changes recorded in ABCs since the last checkpoint for the metadata client, here at least ABC 5006. As illustrated, ABC 5007 is in progress 408 at the time the checkpoint 410 is created, so that the changes with respect to the metadata client are not done by the time the checkpoint 410 was started. Thus, ABC 5007 is included as a dependency recorded in the newly created checkpoint 410, and therefore cannot be ignored. Once the storage controller 108 persists the checkpoint 410 to the metadata store 116, the metadata client may update its advertised dependency to the most recent ABC which includes incremental changes not captured by the checkpoint 410, such as specified in ABC 5007.

To determine whether a given ABC has a dependency on it still (e.g., to aid in determining whether the location in the write-ahead log may be overwritten by new metadata tracking structures (e.g., an ABC object and/or a checkpoint)), dependency information may be tracked for the ABCs stored in the write-ahead log.

Figure 5:
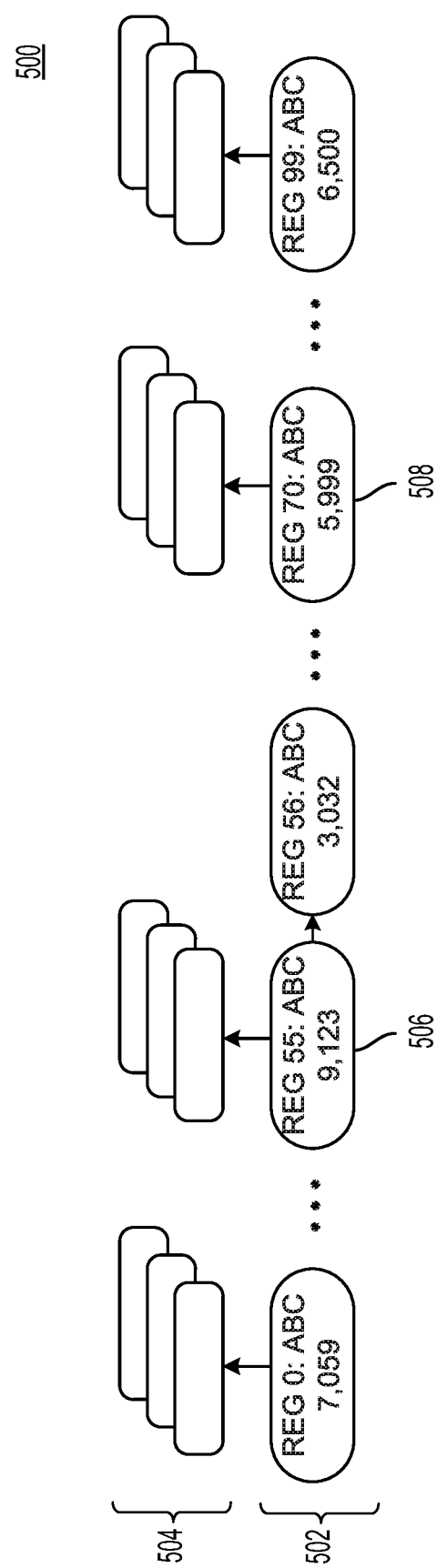
FIG. 5 is an organizational diagram of an exemplary write-ahead log architecture according to aspects of the present disclosure.

An example approach to maintaining this dependency information is illustrated in FIG. 5, which is an organizational diagram 500 of exemplary relationship dependencies between data structures in a write-ahead log 202 according to aspects of the present disclosure. The relationships illustrated in FIG. 5 may be useful, for example, in determining from FIG. 4 whether there are any other remaining dependencies for a given ABC object.

According to embodiments of the present disclosure, dependency may be tracked on a coarser level than per-ABC object, such as per region corresponding to some percent or fraction of a percent of the total capacity (e.g., one or more data extents) of the write-ahead log. This may assist in reducing the computational burden on the storage controller 108 in maintaining the dependency lists. This is demonstrated by the exemplary regions 502 in FIG. 5, regions 0, 55, 56, 70, and 99. Region 0 may correspond to the lowest LBA 204 of the write-ahead log 202, while the region 99 may correspond to the highest (ending) LBA 212, all as illustrated in FIG. 2 with respect to metadata store 116. At this level of granularity, multiple ABC objects and/or checkpoints may be stored in the metadata store 116 in LBAs found within a given region 502.

Each region 502 may be identified by the first ABC stored at an address within the LBA range of the given region 502. For example, as illustrated in FIG. 5 ABC 7,059 is the first ABC object stored at the lowest LBA available at region 0. Also associated with the region 0 is linked list 504 (although referred to as a linked list, other types of lists are alternatively envisioned). Each region 502 may have a corresponding linked list 504. Each box illustrated in FIG. 5 may correspond to a different metadata client with a checkpoint that has recorded a dependency on one or more ABC objects found within the address range for the given region 502. Thus, for region 0, one or more checkpoints may be identified as recording a dependency on one or more ABC objects stored within region 0. Although FIG. 5 illustrates each region 502 having three boxes representing dependencies 504, any number of actual dependencies may exist for any given region 502. Once no more dependencies 504 are linked with the region 0, the region 0 may be reused to store new metadata tracking structures (e.g., ABC objects and/or checkpoints).

Continuing with the illustration in FIG. 5, a number of regions 502 later from region 0 is region 55. As can be seen, ABC 9,123 is the first ABC object stored at the lowest LBA available at region 55. Region 56, which is logically contiguous to region 55, has as its first ABC object stored at its lowest available LBA ABC 3,032. As can be seen, there is a difference between the sequence number of the first ABC stored at a location in region 55 and the sequence number of the first ABC stored at a location in region 56. This corresponds to the wrap point 506 (e.g., corresponding to wrap point 206 of FIG. 2) being somewhere within the region 55. Thus, the region 56 may contain ABC objects and/or checkpoints (if any) that do not have any dependencies anymore and may be overwritten by new data. Thus, FIG. 5 does not illustrate any boxes represented dependencies 504 because, even if there are checkpoints and ABCs within region 56, they are outdated and therefore ignored. A number of regions after region 56 is region 70, which has as its first ABC object stored at its lowest available LBA ABC 5,999. In this example, the region 70 includes the oldest remaining dependency 508 for some ABC object within the range of LBAs of region 70. This corresponds, for example, to dependency point 210 of FIG. 2.

According to embodiments of the present disclosure, a gap between the wrap point 506 and the remaining dependency 508 may be maintained as a target percentage of the total size of the write-ahead log 202. Thus, should additional metadata tracking structures (ABC objects or checkpoints) be added to the next available space in the gap which progresses the wrap point 506, the storage controller 108 may take action if the actual percentage of available space drops below the target percentage. In that case, the storage controller 108 may send an instruction to the metadata clients associated with the metadata tracking structures in the region 70 that include the oldest remaining dependency 508. That instruction may direct the metadata client(s) to move along and create a new checkpoint. That new checkpoint would incorporate any changes in older dependencies, including the one or more that are stored in the region 70 (in this example).

Once the one or more metadata clients with old reported dependencies have created new checkpoints, and those checkpoints have been persisted, then the dependencies may be updated to new ABC objects closer in age to the wrap point 506, thus freeing up the region 70 from any remaining dependencies and increasing the percentage of available space. If that increase does not reach the target percentage, or some range surrounding the target percentage, the move along procedure may be repeated as described above.

Figure 6A:
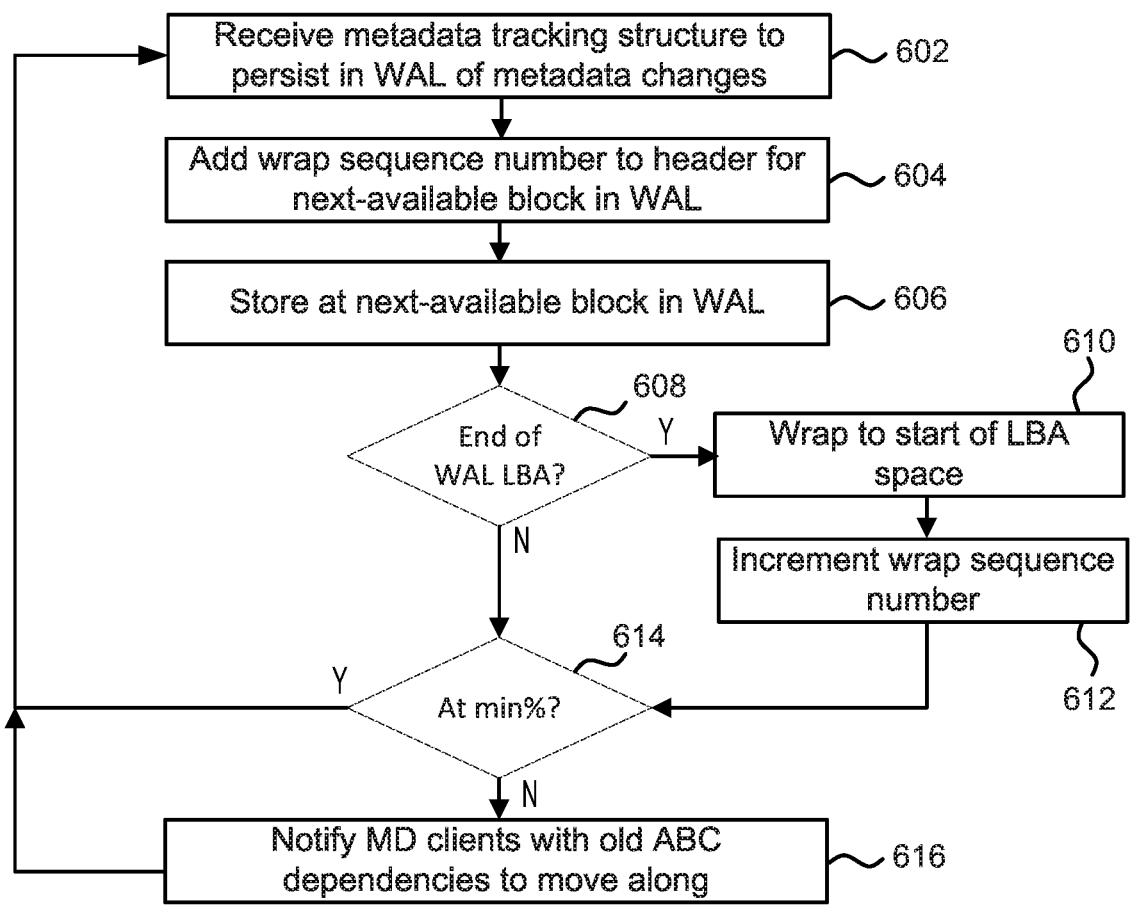
FIG. 6A is a flow diagram of a method for maintaining a write-ahead log during system operation according to aspects of the present disclosure.

Turning now to FIG. 6A, a flow diagram is illustrated of a method 600 for maintaining a write-ahead log according to aspects of the present disclosure. In an embodiment, the method 600 may be implemented by one or more processors of one or more of the storage controllers 108 of the storage system 102, executing computer-readable instructions to perform the functions described herein with respect to a write-ahead log 202. In the description of FIG. 6A, reference is made to a storage controller 108 (108.a or 108.b) for simplicity of illustration, and it is understood that other storage controller(s) may be configured to perform the same functions when performing a pertinent requested operation. It is understood that additional steps can be provided before, during, and after the steps of method 600, and that some of the steps described can be replaced or eliminated for other embodiments of the method 600.

At block 602, the storage controller 108 receives a metadata tracking structure (e.g., an ABC object or a checkpoint) that it is to persist in the write-ahead log 202.

At block 604, the storage controller 108 adds a write sequence number to a header of the data extent where the next-available block of address space is available for writing in the write-ahead log 202. This may be accomplished, for example, with the header structure described above with respect to FIG. 3.

At block 606, the storage controller 108 persists the metadata tracking structure to the next-available block of address space in a given data extent, with the header, in the metadata store 116. For example, if the metadata tracking structure is a checkpoint, any old dependencies reported by the corresponding metadata client to the checkpoint may be updated so that the metadata client now reports a dependency based on the new location of the checkpoint (e.g., as described with respect to FIG. 4 above).

At decision block 608, the storage controller 108 determines whether the current location for actively writing to the write-ahead log 202, referred to above as the wrap point 206, is at the ending (maximum) LBA 212 allocated for the write-ahead log 202. If so, then the method 600 proceeds to block 610.

At block 610, the storage controller 108 wraps to the starting LBA 204 of the write-ahead log 202.

At block 612, the storage controller 108 increments the write sequence number that is added to headers of data extents where the write-ahead log is writing. The write sequence number may also be referred to as the wrap sequence number and assists in identifying the wrap point.

Returning to decision block 608 if the storage controller determines that the current location is not at the ending LBA 212, then the method 600 proceeds to decision block 614 This means that there is still a section 208 available for receiving new data at higher LBAs before wrapping to the start of the LBA space 204.

The method 600 proceeds to decision block 614 from either decision block 608 or block 612. At decision block 614, the storage controller 108 determines whether the size of the section 208 of space available for writing new metadata tracking structures (e.g., ABC objects and/or checkpoints) is at or below a target threshold percent (e.g., a percentage of the total size of the write-ahead log 202). Although described as a percentage, this value may be described in other ways, such as an address space size, memory size, etc.

If the size is below the target threshold, then the method 600 proceeds to block 616. At block 616, the storage controller 108 identifies those metadata clients maintaining dependencies on the oldest ABC objects in the write-ahead log (e.g., as discussed above with respect to FIGS. 3 and 5). The storage controller 108 may do this by checking the linked lists associated with the region with the oldest "active" ABC object(s), as discussed with respect to FIG. 5 above. Once the metadata clients are identified from the linked list of the region that still contains ABC objects with active dependencies, the storage controller 108 instructs them to move along to create a new checkpoint recording newer dependencies. In an embodiment, the metadata client (s) identified here may have one or more sub-components that may each have their own checkpoints. In that case, the metadata client may advertise the dependency of the internal sub-component that is lagging the most.

Returning to decision block 614, if the size is not below the target threshold, then the method 600 returns to block 602 and proceeds as discussed above. The method 600 also proceeds from block 616 back to block 602.

Figure 6B:
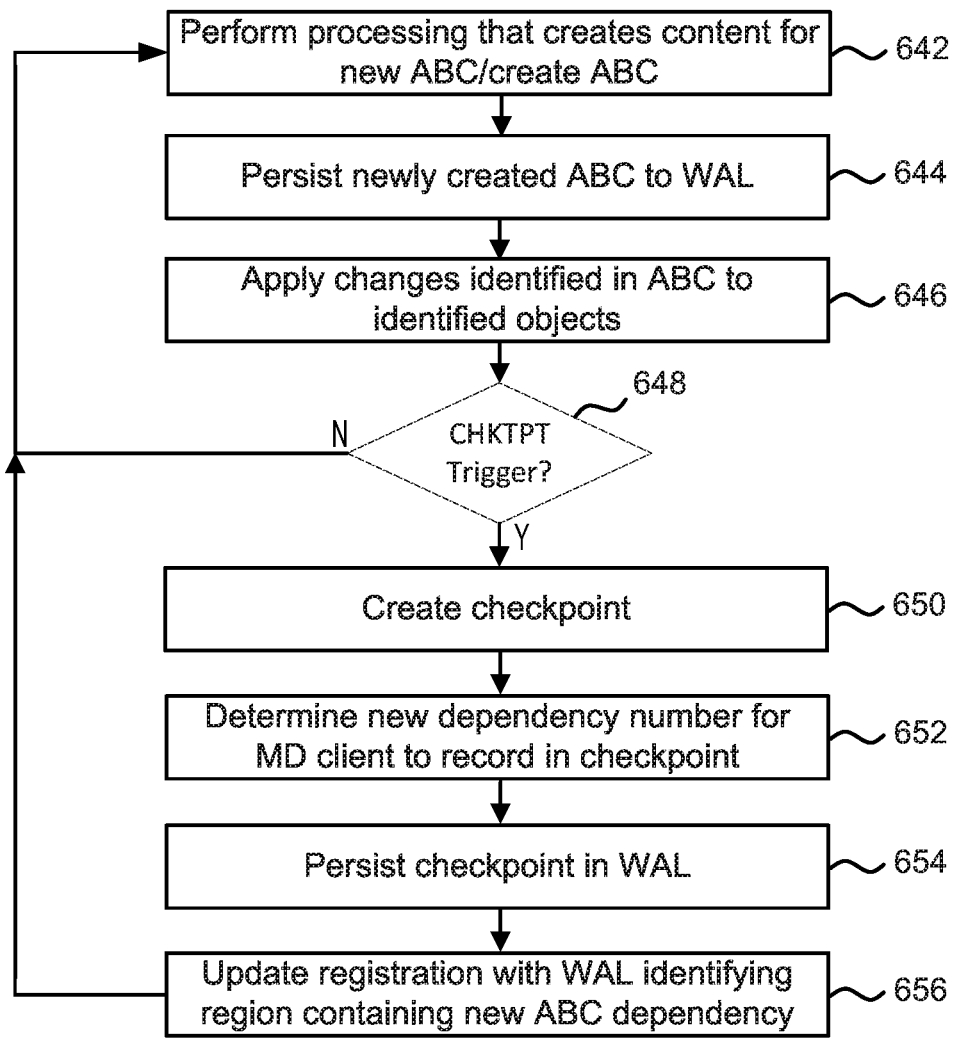
FIG. 6B is a flow diagram of a method for using a write-ahead log during system operation according to aspects of the present disclosure.

Turning now to FIG. 6B, a flow diagram is illustrated of a method 640 for using a write-ahead log according to aspects of the present disclosure. In an embodiment, the method 640 may be implemented by one or more processors of one or more of the storage controllers 108 of the storage system 102, executing computer-readable instructions to perform the functions described herein with respect to a write-ahead log 202. In the description of FIG. 6B, reference is made to a storage controller 108 (108.a or 108.b) for simplicity of illustration, and it is understood that other storage controller(s) may be configured to perform the same functions when performing a pertinent requested operation. It is understood that additional steps can be provided before, during, and after the steps of method 640, and that some of the steps described can be replaced or eliminated for other embodiments of the method 640.

At block 642, the storage controller 108 performs processing that creates content for a new ABC object. This may include, for example, writing data to one or more storage devices 106 on behalf of one or more hosts 104, etc. The ABC object may identify mapping information from the host 104 perspective relative to an internal location where the data is stored.

At block 644, the storage controller 108 persists the ABC object to the write-ahead log 202.

At block 646, the storage controller 108 applies the changes identified in the ABC object persisted at block 644 to the metadata client(s) identified as affected by one or more incremental changes identified in the ABC object, such as to various mapping tables such as trees and indexes.

At decision block 648, if a checkpoint trigger is not detected then the method 640 proceeds back to block 642 and proceeds as discussed above. A checkpoint trigger may be a variety of things, including a move-along instruction such as identified at block 616 of FIG. 6A, detection of a flush of volatile memory content (e.g., a buffer being flushed, therefore indicating that a checkpoint of that buffer after flushing may be at a minimal size), passage of an amount of time, and/or completion of one or more processing events. As an example, when the buffer has just been flushed, the in-memory buffer contents would be quite small, perhaps almost empty, meaning that the corresponding checkpoint should be "cheap" to obtain (e.g., consume a small amount of resources such as write-ahead log 202 space and processing resources/time).

If, instead, a checkpoint trigger is detected (e.g., a move-along instruction) at decision block 648 then the method proceeds to block 650.

At block 650, the storage controller 108 creates a checkpoint for the identified metadata client.

At block 652, the storage controller 108 determines a new dependency number for the checkpoint created at block 650. For example, the dependency number (identifying the ABC object following the most recent ABC object to have been applied to the corresponding metadata client before the checkpoint was taken (e.g., one plus the most recent completed ABC object).

At block 654, the storage controller 108 persists the checkpoint, created at block 650 and with the new dependency number(s) from block 652, in the write-ahead log 202. For example, the storage controller 108 may persist the checkpoint at the current wrap point 206. As a result of the metadata client creating a new checkpoint that records newer dependencies, the oldest region (or multiple regions, depending on need) becomes available for storing new data because there are no more active recorded dependencies to the oldest ABC objects stored there.

At block 656, the storage controller 108 updates the registration with the write-ahead log 202 regarding which region (e.g., a region 502 of FIG. 5) contains the new ABC object dependency(ies). For example, the storage controller 108 may update the linked list 504 corresponding to the region 502 where the dependencies are recorded.

The method 640 then returns to block 642 as proceeds as discussed above.

Since many, if not all, of the metadata clients of the storage system 102 (e.g., mapping tables and sub-components of those to name a few examples) maintain at least a portion of their information in volatile memory during regular system operation, an interruption such as a failure causes the information in the volatile memory (that has not been persisted to non-volatile memory yet such as metadata store 116) to be lost. The write-ahead log 202, according to embodiments of the present disclosure, is used to recover information in the volatile memory for the affected metadata clients when the system restarts from the interruption.

Figure 7:
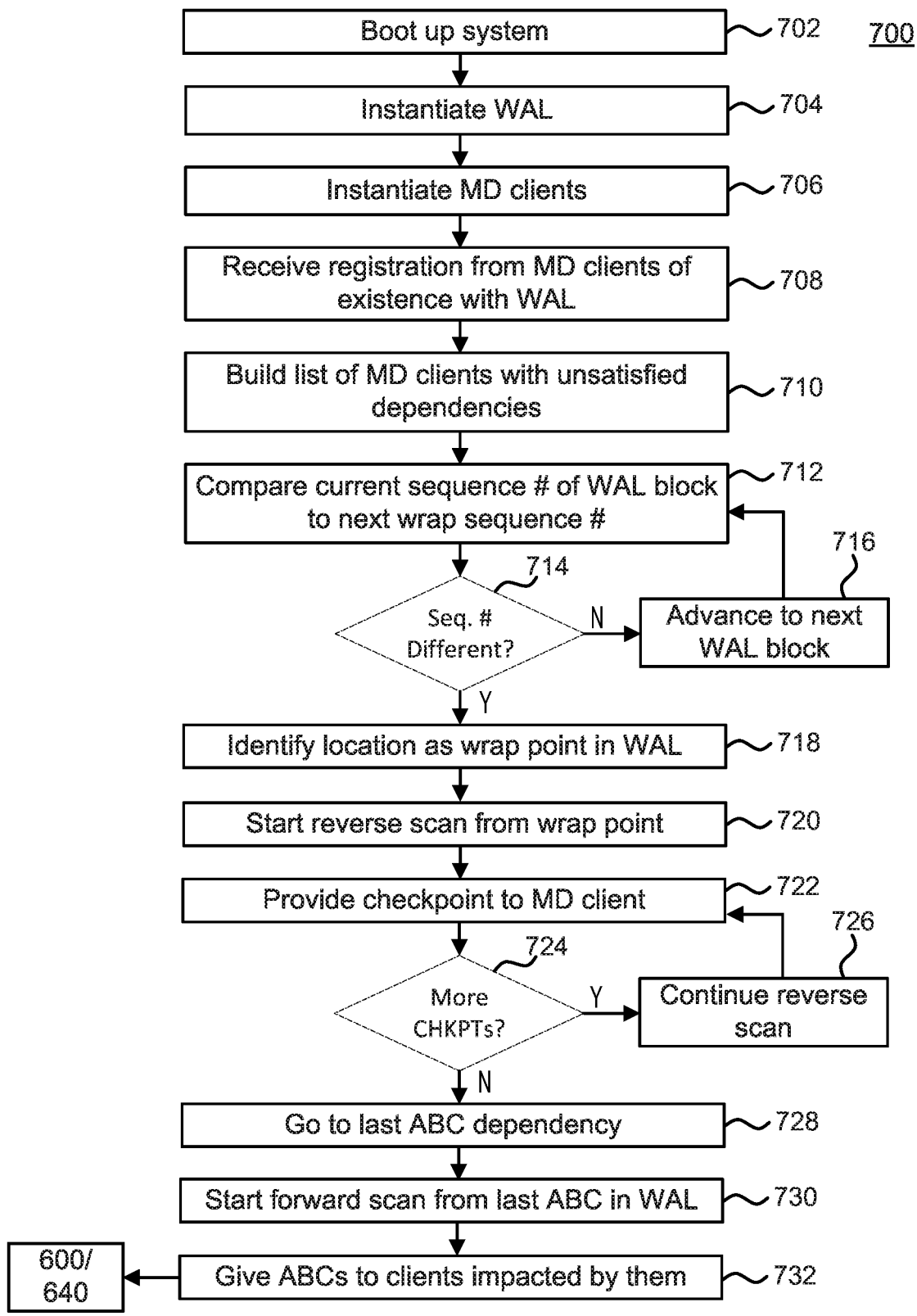
FIG. 7 is a flow diagram of a method for recovering from system interruption according to aspects of the present disclosure.

For example, FIG. 7 is a flow diagram of a method 700 for recovering from a system interruption according to aspects of the present disclosure. In an embodiment, the method 700 may be implemented by one or more processors of one or more of the storage controllers 108 of the storage system 102, executing computer-readable instructions to perform the recovery functions described herein with respect to a write-ahead log 202. In the description of FIG. 7, reference is made to a storage controller 108 (108.a or 108.b) for simplicity of illustration, and it is understood that other storage controller(s) may be configured to perform the same functions when performing a pertinent requested operation. It is understood that additional steps can be provided before, during, and after the steps of method 700, and that some of the steps described can be replaced or eliminated for other embodiments of the method 700.

At block 702, after an interruption of the storage controller 108 (and, potentially, the full storage system 102), the storage controller 108 boots up from the interrupted state.

At block 704, the storage controller 108 instantiates the write-ahead log 202. The storage controller 108 does this by accessing the write-ahead log 202 as stored in the metadata store 116.

At block 706, the storage controller instantiates the metadata entities of the storage system 102, e.g. metadata clients that use the write-ahead log 202 (such as mapping tables and their sub-components). At the time of instantiation of these metadata clients, their corresponding volatile memory buffers are empty (since the data previously stored in those buffers were lost at the time of interruption). Further, the metadata clients' ABC object dependencies are known to be unknown at this time—the metadata clients are unable to report what their dependencies are yet.

At block 708, the storage controller 108 provides the write-ahead log 202 registration information from the instantiated metadata clients, which lets the write-ahead log 202 know of the metadata clients' existence and the types of ABC objects and checkpoints the clients are interested in receiving information about.

At block 710, in response to the registrations of block 708, the storage controller 108 builds a list of metadata clients that have unsatisfied dependencies. Based on the reported information, the storage controller 108 identifies all of the registered metadata clients as having unsatisfied dependencies at this stage of method 700.

At block 712, the storage controller 108 begins the process of locating the wrap point 206 in the write-ahead log 202. The storage controller 108 takes the next available data extent of the write-ahead log (the first time, the first granular chunk of the log) and inspects its header 306 to identify the write sequence number(s) stored therein. After obtaining a first in-line descriptor for a first data extent, the storage controller 108 then obtains the in-line descriptor for a second data extent that is contiguous to the first data extent (or as near to the first data extent for where an in-line descriptor for a next chunk of data is located). The storage controller 108 compares the write sequence number values obtained from the in-line descriptors to each other.

At decision block 714, the storage controller 108 determines whether the compared values are equal to each other or different from each other. If the write sequence numbers are not different from each other, then at block 716 the method 700 proceeds to the next data extent. The method then returns to block 712 and proceeds as discussed above.

Returning to decision block 714, if the write sequence numbers are different from each other, then the method 700 proceeds to block 718. As a result of the above, the storage controller 108 may search sequentially through the write-ahead log 202 until the wrap point 206 is found. Alternatively, the storage controller 108 may use a binary search to locate the wrap point 206 (e.g., by searching for the drop in write sequence value where the wrap point occurs). Thus, the entire write-ahead log 202 may not be scanned in its entirety in some situations.

At block 718, the storage controller 108 identifies the second data extent with the write sequence number that differed from the first data extent's write sequence number as containing the wrap point 206 in the write-ahead log 202.

At block 720, the storage controller 108 begins reverse scanning the write-ahead log from the identified wrap point 206. In this reverse scan, the storage controller 108 searches for checkpoints to the exclusion of ABC objects in the write-ahead log 202. To do so, for example, the storage controller 108 may again analyze the in-line descriptors of the headers of each data extent to determine the metadata tracking structures' types. For example, each in-line descriptor may include as part of its information a content type of the corresponding data for that descriptor. The storage controller 108 may access this information for each in-line descriptor in a given header.

At block 722, for each checkpoint that is located, the storage controller 108 provides the checkpoint to the metadata client that identified interest in the type of checkpoint, for example as identified at block 708. The checkpoints are used by the metadata clients to initialize their data structures in the volatile memory. The metadata clients, upon receipt of any checkpoints, may review those checkpoints to discover their ABC object dependency number (or numbers; any given checkpoint may have one or multiple ABC object dependencies). The metadata clients may identify the oldest ABC object dependency and register that ABC object dependency with the write-ahead log 202 for the region corresponding to where that ABC object is stored (e.g., in a linked list 504). As the metadata clients receive checkpoints, the metadata clients will report that they are now complete with their checkpoint needs.

At decision block 724, the storage controller 108 determines whether there are still metadata clients (one or more) that have unsatisfied dependencies still. If so, then the method 700 proceeds to block 726 and continues reverse scanning for more checkpoints and returns to block 722 to proceed as discussed above. If, during the additional reverse scanning, additional checkpoints are located for metadata clients that have already reported completion of their need for a checkpoint, these may still be reported to the satisfied metadata clients. The satisfied metadata clients may, in turn, ignore these additional checkpoints because, since the scan is in reverse, these may represent older checkpoints that have been rendered obsolete by the newest checkpoint for that metadata client.

If, instead, all the metadata clients have reported that their checkpoint needs are done, then the method 700 proceeds to block 728. At block 728, the storage controller 108 looks to the lowest ABC number registered with the write-ahead log 202 (e.g., as described with respect to block 722 above) and performs the reverse scan to that identified point in the write-ahead log. The storage controller 108 may then reverse scan back to that oldest ABC object dependency. This corresponds to the oldest point in the write-ahead log of interest to the recovery process.

At block 730, the storage controller 108 starts forward scanning from the current position in the write-ahead log 202 located at block 728. During the forward scan, the storage controller 108 searches for ABC objects to the exclusion of checkpoints in the write-ahead log 202. To do so, for example, the storage controller 108 may again analyze the in-line descriptors of the headers of each data extent to determine the metadata tracking structures' types. For example, each in-line descriptor may include as part of its information a content type of the corresponding data for that descriptor. The storage controller 108 may access this information for each in-line descriptor in a given header.

As each ABC object is located, at block 732 the storage controller 108 replays the ABC objects to those metadata clients interested in that ABC object. For example, each of the metadata clients may have registered their interests in particular ABC object types and/or particular ABC objects (e.g., according to their numbers, such as ABC sequence numbers) for use in this reconstruction phase (as well as during regular runtime). Thus, the storage controller 108 may replay each located ABC object to those metadata clients with a reported interest in them. In some embodiments, some older ABC objects may include incremental change information that are outdated for particular metadata clients. For example, a particular metadata client may create a new checkpoint that incorporates this outdated ABC object, but the ABC object remains relevant because it also includes one or more incremental changes to other metadata clients with older checkpoints. In those situations, the metadata clients may ignore the older ABC objects until the storage controller 108 replays ABC objects with ABC sequence numbers identified as dependencies in the current checkpoints for the metadata clients.

This forward scanning and ABC replay continues until the storage controller 108 reaches the wrap point 206 identified at block 718. With this replay, the storage controller 108 makes all recorded incremental changes to the metadata clients to the base checkpoint states in volatile memory that brings the metadata clients back to their pre-interruption states. Once there, the storage system 102 may continue with regular operation and, with respect to metadata, as described with respect to method 600 of FIG. 6.

As a result of the elements discussed above, embodiments of the present disclosure improve upon storage system technology. For example, embodiments of the present disclosure enable the storage system 102 to more efficiently process metadata changes during system I/O, including fewer writes to persistent metadata storage (e.g., avoiding write amplification with host I/O writes). Further, the storage system 102 may more efficiently recover from system interruption events by focusing recovery efforts on only that data that is relevant to a given metadata entity.

In some embodiments, the computing system is programmable and is programmed to execute processes including the processes of methods 600 and/or 700 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include for example non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    writing, by a storage controller, an incremental change set in a write ahead log comprising a plurality of incremental change sets in a solid state drive identified by a wrap point,
    wherein the incremental change set corresponds to a condition of metadata in volatile memory for a metadata client, the incremental change set being written to the solid state drive prior to an update to the metadata;
    tracking, by the storage controller, a dependency of a checkpoint in the write ahead log to at least one of the plurality of incremental change sets, an oldest incremental change set dependency corresponding to a region beyond the wrap point;
    determining, by the storage controller from the tracking, that the checkpoint in the write ahead log records a dependency of the metadata client to the oldest incremental change set, a new checkpoint being persisted in the write ahead log incorporating the dependency to the oldest incremental change set; and
    maintaining a sequence number in the write ahead log, wherein the sequence number corresponds to a number of times that the wrap point has wrapped from an end of an address range to a start of the address range for the write ahead log.

2. The method of claim 1, wherein the determining further comprises:
    accessing, by the storage controller, a list maintained for the region that identifies one or more metadata clients including the metadata client that maintain the checkpoint with the dependency to the oldest incremental change set.

3. The method of claim 1, wherein the checkpoint is one among a plurality of checkpoints that each comprise a backup of a metadata object for the metadata client corresponding to the metadata, and the plurality of incremental change sets each comprise one or more incremental changes to one or more checkpoints from among the plurality of checkpoints.

4. The method of claim 1, further comprising, in response to the storage controller restarting from a failure event:
    identifying, by the storage controller, a point in the write ahead log as the wrap point based on locating where sequence numbers respectively associated with contiguous stored metadata tracking structures, comprising the plurality of incremental change sets and the checkpoint, are different from each other.

5. The method of claim 1, further comprising:
    scanning, by the storage controller, the write ahead log in reverse from the wrap point for checkpoints until reaching a last reported checkpoint from the metadata client to reinstantiate a metadata object corresponding to the metadata client and the last reported checkpoint.

6. The method of claim 1, further comprising:
    scanning, by the storage controller, the write ahead log forward from a last reported checkpoint for incremental change sets to implement incremental changes identified in the incremental change sets to the last reported checkpoint.

7. A non-transitory machine readable medium having stored thereon instructions for performing a method comprising machine executable code which when executed by at least one machine, causes the machine to:
    write an incremental change set in a write ahead log comprising a plurality of incremental change sets in a solid state drive identified by a wrap point, the incremental change set corresponding to a condition of metadata in volatile memory associated with the machine for a metadata client, the incremental change set being written to the solid state drive prior to an update to the metadata;
    determine that a checkpoint in the write ahead log maintains a dependency to at least one outdated incremental change set from the plurality of incremental change sets, a new checkpoint being persisted in the write ahead log incorporating the outdated dependency; and
    maintain a sequence number in the write ahead log, wherein the sequence number corresponds to a number of times that writing has wrapped from an end of an address range to a start of the address range for the write ahead log.

8. The non-transitory machine readable medium of claim 7, further comprising machine executable code that causes the machine, as part of the determination, to:
    access a list maintained for a region of the write ahead log that identifies one or more metadata clients including the metadata client that maintain the checkpoint with the dependency on the outdated incremental change set.

9. The non-transitory machine readable medium of claim 7, wherein the checkpoint comprises a backup of a metadata object for the metadata client corresponding to the metadata, and the incremental change set comprises one or more incremental changes to one or more checkpoints corresponding to one or more metadata objects including the metadata object for the metadata client corresponding to the metadata.

10. The non-transitory machine readable medium of claim 7, further comprising machine executable code that causes the machine, in response to restarting from a failure event, to:
    identify a point in the write ahead log as the wrap point where sequence numbers respectively associated with contiguous data extents, comprising the plurality of incremental change sets and the checkpoint, are different from each other.

11. The non-transitory machine readable medium of claim 7, further comprising machine executable code that causes the machine to:
scan the write ahead log in reverse from the wrap point for checkpoints until receiving a report from the metadata client that a most recent checkpoint has been retrieved to reinstantiate a metadata object corresponding to the metadata client and the most recent checkpoint.

12. The non-transitory machine readable medium of claim 7, further comprising machine executable code that causes the machine to:
scan the write ahead log forward from the most recent checkpoint for incremental change sets to implement incremental changes obtained from incremental change sets to a most recent checkpoint.

13. A computing device comprising:
a memory containing machine readable medium comprising a non-transitory machine executable code having stored thereon instructions for performing a method of maintaining a write ahead log comprising a plurality of incremental change sets;
a processor coupled to the memory, the processor configured to execute the machine executable code to cause the processor to:
write an incremental change set in the write ahead log in a solid state drive identified by a wrap point, the incremental change set corresponding to a condition of metadata in volatile memory associated with the computing device for a metadata client, the incremental change set being written to the solid state drive prior to an update to the metadata;
determine that a checkpoint in the write ahead log maintains a dependency to at least one outdated incremental change set from the plurality of incremental change sets, a checkpoint being persisted in the write ahead log incorporating the outdated dependency; and
maintain a sequence number in the write ahead log, wherein the sequence number corresponds to a number of times that writing has wrapped from an end of an address range to a start of the address range for the write ahead log.

14. The computing device of claim 13, the machine executable code further causing the processor to:
access a list maintained for a region of the write ahead log that identifies one or more metadata clients including the metadata client that maintain the checkpoint with the dependency on the outdated incremental change set.

15. The computing device of claim 13, wherein the checkpoint comprises a backup of a metadata object for the metadata client corresponding to the metadata, and the incremental change set comprises one or more incremental changes to one or more checkpoints corresponding to one or more metadata objects including the metadata object for the metadata client corresponding to the metadata.

16. The computing device of claim 13, the machine executable code further causing the processor, in response to restarting from a failure event, to:
identify a point in the write ahead log as the wrap point where sequence numbers respectively associated with contiguous data extents, comprising the plurality of incremental change sets and the checkpoint, are different from each other.

17. The computing device of claim 13, the machine executable code further causing the processor to:
scan the write ahead log in reverse from the wrap point for checkpoints until receiving a report from the metadata client that a most recent checkpoint has been retrieved to reinstantiate a metadata object corresponding to the metadata client and the most recent checkpoint, and scan the write ahead log forward from the most recent checkpoint for incremental change sets to implement incremental changes obtained from incremental change sets to the most recent checkpoint.

* * * * *